United States Patent
Yoon et al.

(10) Patent No.: US 9,076,596 B2
(45) Date of Patent: Jul. 7, 2015

(54) LAMINATED CERAMIC ELECTRONIC COMPONENT HAVING A COVER LAYER WITH DIELECTRIC GRAINS AND METHOD OF FABRICATING THE SAME

(71) Applicant: SAMSUNG ELECTRO-MECHANICS CO., LTD., Suwon, Gyunggi-do (KR)

(72) Inventors: Seok Hyun Yoon, Gyunggi-do (KR); Byoung Hwa Lee, Gyunggi-do (KR); Chang Hoon Kim, Gyunggi-do (KR); Sang Hoon Kwon, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 83 days.

(21) Appl. No.: 13/839,781

(22) Filed: Mar. 15, 2013

(65) Prior Publication Data
US 2014/0022692 A1    Jan. 23, 2014

(30) Foreign Application Priority Data
Jul. 20, 2012  (KR) .................. 10-2012-0079526

(51) Int. Cl.
*H01G 4/12*    (2006.01)
*H01G 4/30*    (2006.01)

(52) U.S. Cl.
CPC . *H01G 4/12* (2013.01); *H01G 4/30* (2013.01); *H01G 4/1227* (2013.01)

(58) Field of Classification Search
CPC .......... H01G 4/12; H01G 4/30; H01G 4/1227
USPC ...................... 361/321.2, 321.1, 306.3, 301.4
See application file for complete search history.

(56) References Cited

U.S. PATENT DOCUMENTS

| | | | |
|---|---|---|---|
| 6,780,494 B2 * | 8/2004 | Kobayashi et al. | 428/210 |
| 6,839,221 B2 * | 1/2005 | Sugimoto et al. | 361/321.2 |
| 7,324,325 B2 * | 1/2008 | Kojima et al. | 361/311 |
| 8,537,521 B2 * | 9/2013 | Ando et al. | 361/301.4 |
| 2011/0141655 A1 * | 6/2011 | Jeong et al. | 361/303 |

FOREIGN PATENT DOCUMENTS

| | | | |
|---|---|---|---|
| JP | 11-354370 A | | 12/1999 |
| JP | 2007123835 A | * | 5/2007 |
| JP | 2007-173480 A | | 7/2007 |

\* cited by examiner

*Primary Examiner* — David M Sinclair
(74) *Attorney, Agent, or Firm* — McDermott Will & Emery LLP

(57) ABSTRACT

There are provided a laminated ceramic electronic component and a method of fabricating the same. The laminated ceramic electronic component include a ceramic body including a dielectric layer; and first and second internal electrodes disposed to face each other, having the dielectric layer interposed therebetween within the ceramic body, wherein the ceramic body includes an active layer that is a capacitance forming part and a cover layer that is a non-capacitance forming part formed on at least one of a top surface and a bottom surface of the active layer, and when a thickness of the ceramic body is t and a thickness of the cover layer is T, $T \leq t \times 0.05$ is satisfied and when an average particle diameter of a dielectric grain in the active layer is Da and an average particle diameter of a dielectric grain in the cover layer is Dc, $0.7 \leq Dc/Da \leq 1.5$ is satisfied.

16 Claims, 3 Drawing Sheets

B-B'

LAMINATED CERAMIC ELECTRONIC COMPONENT HAVING A COVER LAYER WITH DIELECTRIC GRAINS AND METHOD OF FABRICATING THE SAME

CROSS-REFERENCE TO RELATED APPLICATIONS

This application claims the priority of Korean Patent Application No. 10-2012-0079526 filed on Jul. 20, 2012, in the Korean Intellectual Property Office, the disclosure of which is incorporated herein by reference.

BACKGROUND OF THE INVENTION

1. Field of the Invention

The present invention relates to a high-capacity laminated ceramic electronic component having excellent humidity resistance and a method of fabricating the same.

2. Description of the Related Art

Recently, as electronic products have been miniaturized, demand for small, large-capacity laminated ceramic electronic component has been increased.

Therefore, thinning and increasing an amount of laminations in a dielectric substance and an internal electrode have been attempted by various methods. Recently, laminated ceramic electronic component with thinned dielectric layers and an increased number of laminated layers have been fabricated.

In addition, in order to implement thinness in a dielectric layer, ceramic electronic parts formed of dielectric layers comprising fine ceramic powders have been fabricated recently.

Further, as a demand for small, high-capacity electronic parts has increased, a thickness of a cover layer that is a non-capacitance-forming part is also small.

This causes a problem in terms of humidity resistance characteristics of laminated ceramic electronic component, thereby reducing the reliability thereof.

Further, the lifespan of a laminated ceramic electronic component may be shortened due to the problem of humidity resistance characteristic.

SUMMARY OF THE INVENTION

An aspect of the present invention provides a high-capacity laminated ceramic electronic component having excellent humidity resistance characteristics and a method of fabricating the same.

According to an aspect of the present invention, there is provided a laminated ceramic electronic component, including: a ceramic body including a dielectric layer; and first and second internal electrodes disposed to face each other, having the dielectric layer interposed therebetween within the ceramic body, wherein the ceramic body includes an active layer that is a capacitance forming part and a cover layer that is a non-capacitance forming part formed on at least one of a top surface and a bottom surface of the active layer, and when a thickness of the ceramic body is t and a thickness of the cover layer is T, $T \leq t \times 0.05$ is satisfied and when an average particle diameter of a dielectric grain in the active layer is Da and an average particle diameter of a dielectric grain in the cover layer is Dc, $0.7 \leq Dc/Da \leq 1.5$ is satisfied.

In a case in which the cover layer is divided into three equal parts in a thickness direction, when an average particle diameter of a dielectric grain in an outermost part among the three equal parts is Dc1 and an average particle diameter of a dielectric grain in an intermediate part among the three equal part is Dc2, $1.11 \leq Dc1/Dc2 \leq 2.91$ may be satisfied.

A ratio of Dc1 to Dc2 may satisfy $1.56 \leq Dc1/Dc2 \leq 2.63$.

In the case in which the cover layer is divided into three equal parts in a thickness direction, when an average particle diameter of a dielectric grain in an outermost part among the three equal parts is Dc1 and an average particle diameter of a dielectric grain in a bottom part among the three equal parts is Dc3, $1.13 \leq Dc1/Dc3 \leq 4.88$ may be satisfied.

A ratio of Dc1 to Dc3 may satisfy $1.74 \leq Dc1/Dc3 \leq 3.59$.

According to another aspect of the present invention, there is provided a laminated ceramic electronic component, including: a ceramic body including a dielectric layer; and first and second internal electrodes disposed to face each other, having the dielectric layer interposed therebetween within the ceramic body, wherein the ceramic body includes an active layer that is a capacitance forming part and a cover layer that is a non-capacitance-forming part formed on at least one of a top surface and a bottom surface of the active layer, and when a thickness of the ceramic body is t and a thickness of the cover layer is T, $T \leq t \times 0.05$ is satisfied, and in a case in which the cover layer is divided into three equal parts, when an average particle diameter of a dielectric grain in an outermost part among the three equal parts is Dc1 and an average particle diameter of a dielectric grain in an intermediate part among the three equal part is Dc2, $1.11 \leq Dc1/Dc2 \leq 2.91$ is satisfied.

A ratio of Dc1 to Dc2 may satisfy $1.56 \leq Dc1/Dc2 \leq 2.63$.

In the case in which the cover layer is divided into three equal parts in the thickness direction, when an average particle diameter of a dielectric grain in a bottom part among the three equal parts is Dc3, $1.13 \leq Dc1/Dc3 \leq 4.88$ may be satisfied.

A ratio of Dc1 to Dc3 may satisfy $1.74 \leq Dc1/Dc3 \leq 3.59$.

A ratio of Dc1 to Dc2 may satisfy $1.56 \leq Dc1/Dc2 \leq 2.63$, and in the case in which the cover layer is divided into three equal parts in the thickness direction, when an average particle diameter of a dielectric grain in a bottom part among the three equal parts is Dc3, $1.13 \leq Dc1/Dc3 \leq 4.88$ may be satisfied.

When an average particle diameter of a dielectric grain in the active layer is Da and the average particle diameter of the dielectric grain in the cover layer is Dc, $0.7 \leq Dc/Da \leq 1.5$ may be satisfied.

According to another aspect of the present invention, there is provided a laminated ceramic electronic component, including: a ceramic body including a dielectric layer; and first and second internal electrodes disposed to face each other, having the dielectric layer interposed therebetween within the ceramic body, wherein the ceramic body includes an active layer that is a capacitance forming part and a cover layer that is a non-capacitance-forming part formed on at least one of a top surface and a bottom surface of the active layer, and in a case in which the cover layer is divided into three equal parts in a thickness direction, when an average particle diameter of a dielectric grain in an outermost part among the three equal parts is Dc1 and an average particle diameter of a dielectric grain in a bottom part among the three equal parts is Dc3, $1.13 \leq Dc1/Dc3 \leq 4.88$ is satisfied.

A ratio of Dc1 to Dc3 may satisfy $1.74 \leq Dc1/Dc3 \leq 3.59$.

When a thickness of the ceramic body is t and a thickness of the cover layer is T, $T \leq t \times 0.05$ may be satisfied, and when an average particle diameter of a dielectric grain in the active layer is Da and the average particle diameter of the dielectric grain in the cover layer is Dc, $0.7 \leq Dc/Da \leq 1.5$ may be satisfied.

In the case in which the cover layer is divided into three equal parts in the thickness direction, when the outermost part among the three equal parts is Dc1 and an average particle diameter of a dielectric grain in an intermediate part among the three equal parts is Dc2, 1.11≤Dc1/Dc2≤2.91 may be satisfied.

A ratio of Dc1 to Dc2 may satisfy 1.56≤Dc1/Dc2≤2.63.

According to another aspect of the present invention, there is provided a method of fabricating a laminated ceramic electronic component, the method including: preparing ceramic green sheets using a slurry including ceramic powder and an additive; forming internal electrode patterns on each of the ceramic green sheets using a conductive metal paste; and laminating the ceramic green sheets and performing sintering thereon to form a ceramic body including a dielectric layer and first and second internal electrodes disposed to face each other, having the dielectric layer interposed therebetween, wherein the ceramic body includes an active layer that is a capacitance forming part and a cover layer that is a non-capacitance forming part formed on at least one of a top surface and a bottom surface of the active layer, and when a thickness of the ceramic body is t and a thickness of the cover layer is T, T≤t×0.05 is satisfied and when an average particle diameter of a dielectric grain in the active layer is Da and an average particle diameter of a dielectric grain in the cover layer is Dc, 0.7≤Dc/Da≤1.5 is satisfied.

The average particle diameter of the dielectric grain in the cover layer may be controlled by controlling a composition of the additive.

In the case in which the cover layer is divided into three equal parts in a thickness direction, when an average particle diameter of a dielectric grain in an outermost part among the three equal parts is Dc1 and an average particle diameter of a dielectric grain in an intermediate part among the three equal parts is Dc2, 1.11≤Dc1/Dc2≤2.91 may be satisfied.

In the case in which the cover layer is divided into three equal parts in a thickness direction, when an average particle diameter of a dielectric grain in an outermost part among the three equal parts is Dc1 and an average particle diameter of a dielectric grain in a bottom part among the three equal parts is Dc3, 1.13≤Dc1/Dc3≤4.88 may be satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
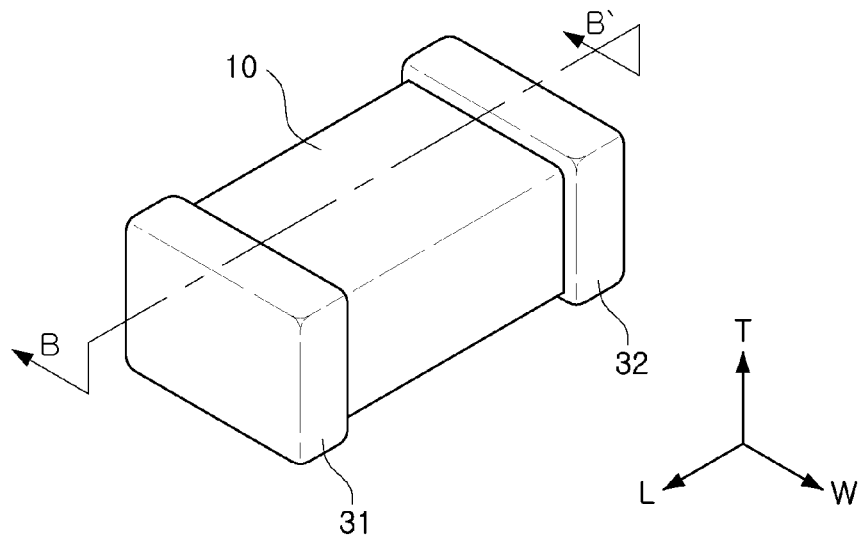
FIG. 1 is a perspective view schematically illustrating a laminated ceramic capacitor according to an exemplary embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a perspective view schematically illustrating a laminated ceramic capacitor according to an exemplary embodiment of the present invention.

Figure 2:
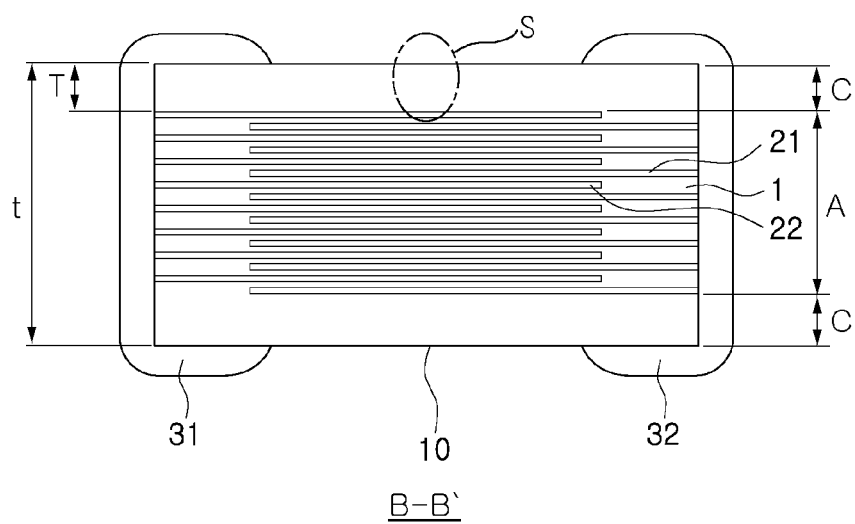
FIG. 2 is a cross-sectional view taken along line B-B' of FIG. 1.

FIG. 2 is a cross-sectional view taken along line B-B' of FIG. 1.

Figure 3:
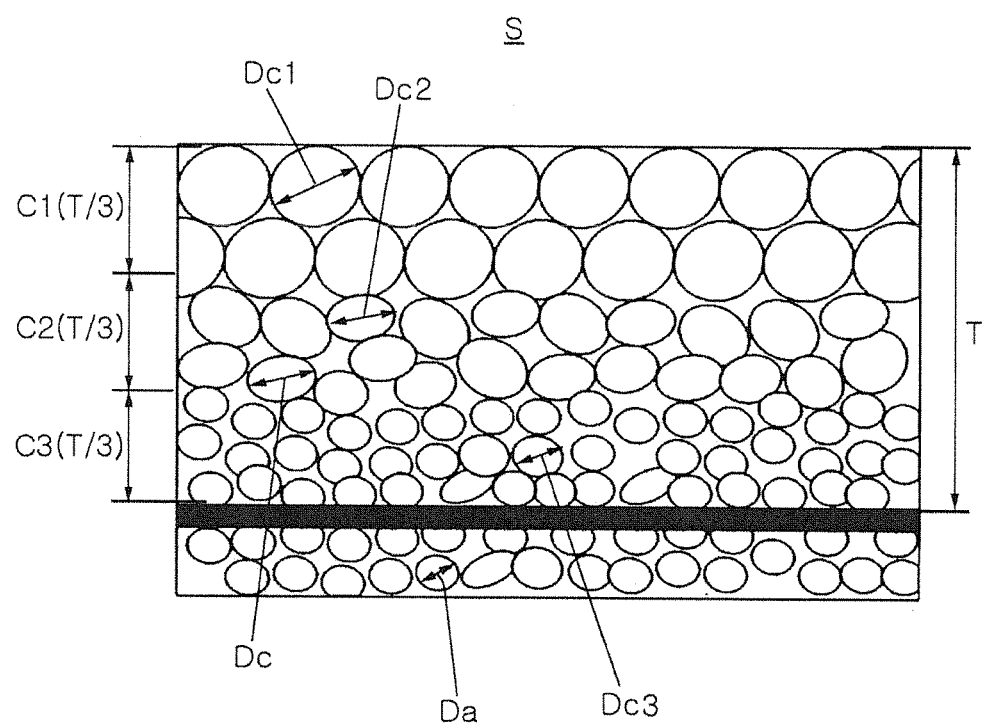
FIG. 3 is an enlarged view of area S in FIG. 2.

FIG. 3 is an enlarged view of area S in FIG. 2.

Referring to FIGS. 1 to 3, a laminated ceramic electronic component according to an embodiment of the present invention includes a ceramic body 10 including a dielectric layer 1, and first and second internal electrodes 21 and 22 disposed to face each other, having the dielectric layer 1 interposed therebetween within the ceramic body 10, wherein the ceramic body 10 includes an active layer A that is a capacitance forming part and a cover layer C that is a non-capacitance forming part formed on at least one of a top surface and a bottom surface of the active layer A and when a thickness of the ceramic body 10 is t and a thickness of the cover layer C is T, T≤t×0.05 may be satisfied and when an average particle diameter of a dielectric grain in the active layer A is Da and an average particle diameter of a dielectric grain in the cover layer C is Dc, 0.7≤Dc/Da≤1.5 may be satisfied.

Hereinafter, the laminated ceramic electronic component according to the embodiment of the present invention will be described. In particular, the embodiment of the present invention describes a laminated ceramic capacitor as the laminated ceramic electronic component, but is not limited thereto.

The laminated ceramic capacitor according to the embodiment of the present invention includes the ceramic body 10 including the dielectric layer 1 and the first and second internal electrodes 21 and 22 disposed to face each other, having the dielectric layer 1 interposed therebetween within the ceramic body 10, wherein the ceramic body 10 includes the active layer A that is the capacitance forming part and the cover layer C that is a non-capacitance forming part formed on at least one of the top surface and the bottom surface of the active layer A and when the thickness of the ceramic body 10 is t and the thickness of the cover layer C is T, T≤t×0.05 may be satisfied.

A raw material forming the dielectric layer 1 is not specifically limited, as long as a sufficient amount of capacitance can be obtained therewith. As the raw material, for example, a barium titanate ($BaTiO_3$) powder may be used.

According to an object of the present invention, various types of ceramic additives, organic solvents, plasticizers, coupling agents, dispersing agents, and the like, may be added to powder such as barium titanate ($BaTiO_3$), or the like, a material forming the dielectric layer 1.

According to the embodiment of the present invention, when the thickness of the ceramic body 10 is t and the thickness of the cover layer C is T, T≤t×0.05 may be satisfied.

That is, the thickness of the cover layer C may be 5% less than that of the ceramic body 10, but in order to implement a small, high-capacity laminated ceramic capacitor, the thickness of the cover layer C may be less.

According to the embodiment of the present invention, even when the thickness of the cover layer C is 5% less than that of the ceramic body 10, it is possible to implement the laminated ceramic capacitor having excellent humidity resistance.

On the other hand, when the thickness of the cover layer C is 5% greater than that of the ceramic body 10, the thickness of the cover layer C is sufficient, such that defects in humidity resistance characteristics and acceleration lifespan may not occur.

A material forming the first and second internal electrode layers 21 and 22 is not particularly limited. For example, the first and second internal electrode layers 21 and 22 may be formed of a precious metal such as palladium (Pd), palladium-silver (Pd—Ag) alloy, and the like, and a conductive paste consisting of at least one of nickel (Ni) and copper (Cu).

Meanwhile, for forming capacitance, external electrodes 31 and 32 may be formed on the outside of the ceramic body 10 and may be electrically connected with the internal electrode layers 21 and 22.

The external electrodes 31 and 32 may be formed of a conductive material the same as the internal electrode but is not limited thereto and may be formed of, for example, copper (Cu), silver (Ag), nickel (Ni), and the like.

The external electrodes 31 and 32 may be formed by applying a conductive paste prepared by adding glass frit to metal powder and performing firing on the conductive paste.

According to the embodiment of the present invention, the average particle diameter of the dielectric grain in the active layer A is Da and the average particle diameter of the dielectric grain in the cover layer C is Dc, $0.7 \leq Dc/Da \leq 1.5$ may be satisfied.

The average particle diameter Da of the dielectric grain in the active layer A and the average particle diameter Dc of the dielectric grain in the cover layer C may be measured by analyzing a photograph of a cross section of the dielectric layer extracted by a scanning electron microscope (SEM) shown in FIG. 2, by cutting the ceramic body 10 in a lamination direction of the dielectric layer 1.

For example, the average particle diameter Da of the dielectric grain in the active layer A and the average particle diameter Dc of the dielectric grain in the cover layer C may be measured using grain size measuring software that supports an average grain size standard measuring method defined in American Society for Testing and Materials (ASTM) E112.

The high-capacity laminated ceramic capacitor according to the embodiment of the present invention may have the excellent humidity resistance by controlling the average particle diameter Da of the dielectric grain in the active layer A and the average particle diameter Dc of the dielectric grain in the cover layer C so as to satisfy $0.7 \leq Dc/Da \leq 1.5$.

Further, the high-capacity laminated ceramic capacitor may be excellent in terms of reliability by having excellent humidity resistance characteristics and a long lifespan.

When a ratio Dc/Da of the average particle diameter Da of the dielectric grain in the active layer A and the average particle diameter Dc of the dielectric grain in the cover layer C is less than 0.7, as the average particle diameter Dc of the dielectric grain in the cover layer C is relatively small, a sintering initiation temperature is delayed, and as a result, cracks may occur.

When a ratio Dc/Da of the average particle diameter Da of the dielectric grain in the active layer A and the average particle diameter Dc of the dielectric grain in the cover layer C exceeds 1.5, the average particle diameter Dc of the dielectric grain in the cover layer C is relatively large and as a result, humidity resistance characteristics may be degraded.

In the laminated ceramic capacitor according to the embodiment of the present invention, in the case in which the cover layer C is divided into three equal parts in a thickness direction, when an average particle diameter of a dielectric grain in an outermost part C1 among the three equal parts is Dc1 and an average particle diameter of a dielectric grain in an intermediate part C2 among the three equal parts is Dc2, $1.11 \leq Dc1/Dc2 \leq 2.91$ may be satisfied.

In the embodiment of the present invention, the cover layer C may be divided into a three equal parts in a thickness direction, but the embodiment of the present invention is not limited thereto and therefore, can be divided into a plurality of parts.

The high-capacity laminated ceramic capacitor with excellent humidity resistance characteristics can be implemented by controlling a ratio of the average particle diameter Dc1 of the dielectric grain in the outermost part C1 to the average particle diameter Dc2 of the dielectric grain in the intermediate part C2 so as to satisfy $1.11 \leq Dc1/Dc2 \leq 2.91$.

Further, when the ratio of Dc1 to Dc2 satisfies $1.56 \leq Dc1/Dc2 \leq 2.63$, the high-capacity laminated ceramic capacitor may be excellent in terms of reliability by having excellent humidity resistance characteristics and a long lifespan.

The outermost part C1 may mean an external layer in a thickness direction, that is, a top surface of the ceramic body 10 when the cover layer C is divided into three equal parts in a thickness direction.

When the ratio Dc1/Dc2 of the average particle diameter Dc1 of the dielectric grain in the outermost part to the average particle diameter Dc2 of the dielectric grain in the intermediate part is less than 1.11, the difference between the average particle diameter of the dielectric grain in the outermost part and the average particle diameter of the dielectric grain in the intermediate part is not large and as a result, cracks may occur.

On the other hand, when the ratio Dc1/Dc2 of the average particle diameter Dc1 of the dielectric grain in the outermost part C1 to the average particle diameter Dc2 of the dielectric grain in the intermediate part C2 exceeds 2.91, the difference between the average particle diameter of the dielectric grain in the outermost part C1 and the average particle diameter of the dielectric grain in the intermediate part C2 is too large and as a result, humidity resistance characteristics may be degraded.

In the laminated ceramic capacitor according to the embodiment of the present invention, in the case in which the cover layer C is divided into three equal parts in a thickness direction, when the average particle diameter of the dielectric grain in the outermost part C1 among the three equal parts is Dc1 and an average particle diameter of a dielectric grain in a bottom part C3 among the three equal part is Dc3, $1.13 \leq Dc1/Dc3 \leq 4.88$ may be satisfied.

The high-capacity laminated ceramic capacitor having excellent humidity resistance characteristics can be implemented by controlling a ratio of the average particle diameter Dc1 of the dielectric grain in the outermost part C1 to the average particle diameter Dc3 of the dielectric grain in the bottom part C3 so as to satisfy $1.13 \leq Dc1/Dc3 \leq 4.88$.

Further, when the ratio of Dc1 to Dc3 satisfies $1.74 \leq Dc1/Dc3 \leq 3.59$, the high-capacity laminated ceramic capacitor may be excellent in terms of reliability by having excellent humidity resistance characteristics and a long acceleration lifespan.

The bottom part C3 may mean an inner part of the parts in the thickness direction, that is, an area adjacent to the active layer A that is the capacity forming part of the ceramic body 10 when the cover layer C is divided into three equal parts in the thickness direction.

When the ratio Dc1/Dc3 of the average particle diameter Dc1 of the dielectric grain in the outermost part to the average particle diameter Dc3 of the dielectric grain in the bottom part is less than 1.13, the difference between the average particle diameter of the dielectric grain in the outermost part and the average particle diameter of the dielectric grain in the bottom part is not large and as a result, cracks may occur.

On the other hand, when the ratio Dc1/Dc3 of the average particle diameter Dc1 of the dielectric grain in the outermost part and the average particle diameter Dc3 of the dielectric grain in the bottom part exceeds 4.88, the difference between the average particle diameter of the dielectric grain in the outermost part and the average particle diameter of the dielectric grain in the bottom part is too large and as a result, humidity resistance characteristics may be degraded.

The cover layer C is not particularly limited and therefore, may include, for example, ceramic powder and additives.

According to the embodiment of the present invention, a method of controlling the average particle diameter of the dielectric grain in each area of the cover layer C may be performed by controlling the composition of the additives, but the embodiment of the present invention is not limited thereto.

A laminated ceramic electronic component according to another embodiment of the present invention includes the ceramic body 10 including the dielectric layer 1 and the first and second internal electrodes 21 and 22 disposed to face each other, having the dielectric layer 1 interposed therebetween within the ceramic body 10, wherein the ceramic body 10 includes the active layer A that is the capacitance forming part and the cover layer C that is a non-capacitance forming part formed on at least one of the top surface and the bottom surface of the active layer A, and when the thickness of the ceramic body 10 is t and the thickness of the cover layer C is T, T≤t×0.05 may be satisfied and when the cover layer C is divided into three equal parts in the thickness direction, the average particle diameter of the dielectric grain in the outer most part C1 among the three equal parts is Dc1 and the average particle diameter of the dielectric grain in the intermediate part C2 among the three equal parts is Dc2, 1.11≤Dc1/Dc2≤2.91 may be satisfied.

The cover layer may include ceramic powder and additives and the average particle diameter of the dielectric grain in the cover layer may be controlled by controlling the composition of the additives.

In the laminated ceramic electronic component according to another embodiment of the present invention, parts overlapped with those of the laminated ceramic electronic component according to the embodiment of the present invention as described above will be omitted herein.

The laminated ceramic electronic component according to another embodiment of the present invention includes the ceramic body 10 including the dielectric layer 1 and the first and second internal electrodes 21 and 22 disposed to face each other, having the dielectric layer 1 interposed therebetween within the ceramic body 10, wherein the ceramic body 10 includes the active layer A that is the capacitance forming part and the cover layer C that is non-capacitance forming part formed on at least one of the top surface and the bottom surface of the active layer A and when the thickness of the ceramic body 10 is t and the thickness of the cover layer C is T, T≤t×0.05 may be satisfied and when the cover layer C is divided into three equal parts in the thickness direction, the average particle diameter of the dielectric grain in the outermost part among the three equal parts is Dc1 and the average particle diameter of the dielectric grain in the bottom part among the three equal part is Dc3, 1.13≤Dc1/Dc3≤4.88 may be satisfied.

When the average particle diameter of the dielectric grain in the active layer A is Da and the average particle diameter of the dielectric grain in the cover layer C is Dc, 0.7≤Dc/Da≤1.5 may be satisfied and when the average particle diameter of the dielectric grain in the intermediate part of the cover layer C is Dc2, 1.11≤Dc1/Dc2≤2.91 may be satisfied.

According to another embodiment of the present invention, when the thickness of the ceramic body 10 is t and the thickness of the cover layer C is T, the high-capacity laminated ceramic capacitor with excellent humidity resistance characteristics can be implemented by satisfying the relationships T≤t×0.05, 0.7≤Dc/Da≤1.5, 1.11≤Dc1/Dc2≤2.91, and 1.13≤Dc1/Dc3≤4.88.

Further, the high-capacity laminated ceramic capacitor may be excellent in terms of reliability by having excellent humidity resistance characteristics and a long acceleration lifespan by satisfying the relationships 1.56≤Dc1/Dc2≤2.63 and 1.74≤Dc1/Dc3≤3.59.

The cover layer C may include the ceramic powder and the additives and the average particle diameter of the dielectric grain in the cover layer may be controlled by controlling the composition of the additives.

In the laminated ceramic electronic component according to another embodiment of the present invention, parts overlapped with those of the laminated ceramic electronic component according to the embodiment of the present invention as described above will be omitted herein.

Figure 4:
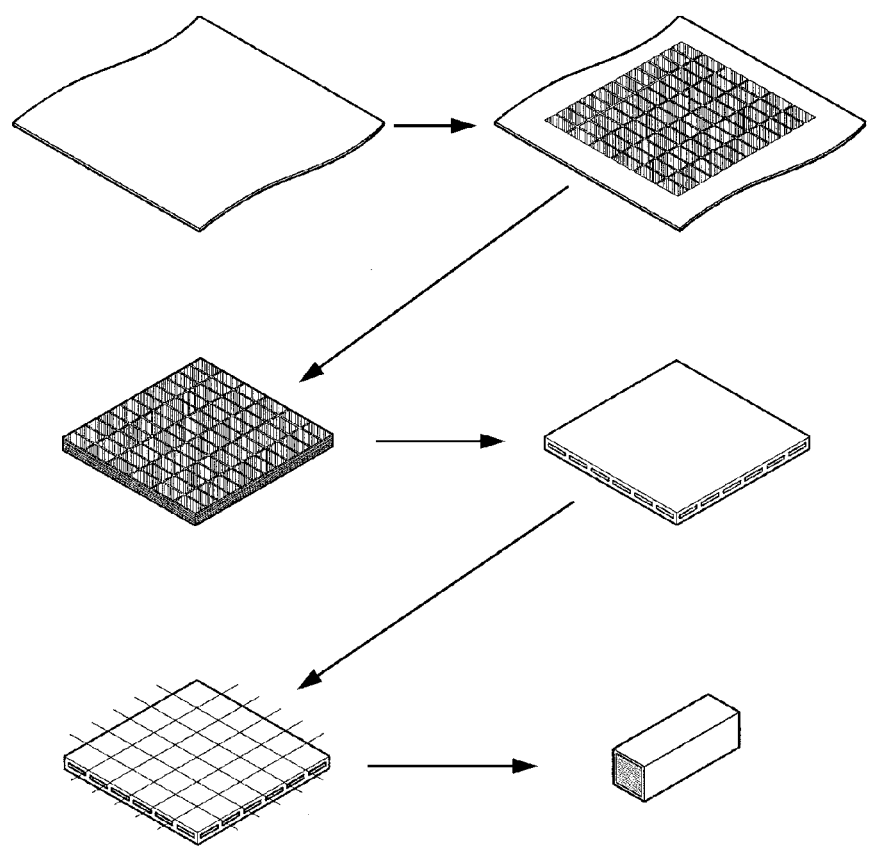
FIG. 4 is a fabrication process diagram of a laminated ceramic capacitor according to another embodiment of the present invention.

FIG. 4 is a fabrication process diagram of a laminated ceramic capacitor according to another embodiment of the present invention.

Referring to FIG. 4, a method of fabricating a laminated ceramic electronic body according to another embodiment of the present invention includes preparing ceramic green sheets using slurry including ceramic powder and additives, forming internal electrode patterns on each of the ceramic green sheets using a conductive metal paste, and laminating the ceramic green sheets and performing sintering thereon to form the ceramic body including a dielectric layer and the first and second internal electrodes disposed to each other, having the dielectric layer interposed therebetween, wherein the ceramic body includes the active layer that is the capacitance forming part and the cover layer that is a non-capacitance forming part formed on at least one of the top surface and the bottom surface of the active layer and when the thickness of the ceramic body is t and the thickness of the cover layer is T, T≤t×0.05 may be satisfied and when the average particle diameter of the dielectric grain in the active layer is Da and the average particle diameter of the dielectric grain in the cover layer is Dc, 0.7≤Dc/Da≤1.5 may be satisfied.

In the method of fabricating a laminated ceramic electronic component according to the embodiment of the present invention, the ceramic green sheets may first be prepared using the slurry including the ceramic powder and the additives.

The ceramic green sheets may be fabricated by preparing a slurry by mixing ceramic powder, a binder, and a solvent and forming the slurry in the form of sheets each having a thickness of several μm by a Doctor blade method.

Next, the internal electrode patterns may be formed on each of the ceramic green sheets using the conductive metal paste.

Next, the ceramic body including the dielectric layer and the first and second internal electrodes disposed to face each other, having the dielectric layer interposed therebetween may be formed by laminating the ceramic green sheets on which the internal electrode patterns are formed and performing sintering thereon.

The ceramic body of the laminated ceramic electronic component fabricated by the fabricating method according to another embodiment of the present invention includes the active layer that is the capacitance forming part and the cover layer that is a non-capacitance forming part formed on at least one of the top surface and the bottom surface of the active layer, wherein when the thickness of the ceramic body is t and the thickness of the cover layer is T, T≤t×0.05 may be satisfied and when the average particle diameter of the dielectric grain in the active layer is Da and the average particle diameter of the dielectric grain in the cover layer is Dc, 0.7≤Dc/Da≤1.5 may be satisfied.

The cover layer may include the ceramic powder and the additives and the average particle diameter of the dielectric grain in the cover layer may be controlled by controlling the composition of the additives.

The description of the features and the same parts of the laminated ceramic electronic component according to the embodiment of the present invention will be omitted hereinafter.

Hereinafter, the present invention will be described in more detail with reference to the embodiments, but is not limited thereto.

An inventive example was performed to determine whether humidity resistance characteristics and a high-temperature acceleration lifespan are improved according to the thickness t of the ceramic body, the thickness T of the cover layer, the average particle diameter Da of the dielectric grain in the active layer, the average particle diameter Dc of the dielectric grain in the cover layer, and values of Dc1, Dc2, and Dc3, with respect to the laminated ceramic capacitor including the active layer that is the capacitance forming part and a non-capacitance forming part formed on at least one surface of the top surface and the bottom surface of the active layer.

The laminated ceramic capacitor according to the inventive example was fabricated according to the following process.

First, the dielectric layer 1 was formed by preparing each of the plurality of ceramic green sheets fabricated by applying the slurry including powder such as barium titanate $BaTiO_3$, or the like on a carrier film and drying the slurry.

Next, a conductive paste for an internal electrode is prepared and is then applied to each of the ceramic green sheets by a screen printing method to form internal electrodes. Thereafter, 190 to 250 of the ceramic green sheets having the internal electrodes formed thereon are stacked to form a laminate.

In particular, the laminate was fabricated by variously changing and controlling the average particle diameter of the dielectric grain in the cover layer by controlling the composition of the additives provided together with barium titanate $BaTiO_3$ within the green sheet.

Next, a 0603-standard sized chip was fabricated by compressing and cutting the laminate and the chip was fired at a temperature of 1050 to 1200° C. under a reduction atmosphere of 0.1% or less of $H_2$.

Next, the laminated ceramic capacitor was fabricated by processes such as external electrode, plating, and the like.

The following Table 1 is a table illustrating comparison results of crack occurrence, humidity resistance characteristics, and a high-temperature acceleration lifespan, depending on the ratio of the thickness T of the cover layer to the thickness t of the ceramic body

TABLE 1

| Sample N0. | Thickness T of Cover Layer/Thickness t of Ceramic Body | Dc/Da | Dc1 (nm) | Dc2 (nm) | Dc3 (nm) | Dc1/Dc2 | Dc1/Dc3 | Crack Occurrence | Humidity Resistance Characteristics | High-temperature Acceleration Lifespan |
|---|---|---|---|---|---|---|---|---|---|---|
| *1 | 0.040 | 1.53 | 72.6 | 72.8 | 71.4 | 0.997 | 1.017 | ○ | NG | 4 h |
| *2 | 0.045 | 1.59 | 640.0 | 200.0 | 182.9 | 1.002 | 1.007 | ○ | NG | 5 h |
| *3 | 0.050 | 1.57 | 250.0 | 200.0 | 45.5 | 1.034 | 1.019 | ○ | NG | 4 h |
| *4 | 0.060 | 1.63 | 312.5 | 250.0 | 71.4 | 0.995 | 1.011 | X | OK | 12 h |
| *5 | 0.070 | 1.72 | 800.0 | 250.0 | 228.6 | 1.033 | 1.024 | X | OK | 13 h |
| *6 | 0.080 | 1.69 | 312.5 | 250.0 | 56.8 | 0.988 | 1.016 | X | OK | 13 h |

Referring to Table 1, in the case of samples 1 to 3 in which the ratio of the thickness T of the cover layer to the thickness t of the ceramic body was 0.05 or less, it can be appreciated that humidity resistance characteristics were degraded when the ratio of Dc/Da exceeded 1.5 and thus, deviated from a numerical range of the present invention. Further, when the ratios of Dc1/Dc2 and Dc1/Dc3 deviated from the numerical range of the present invention, it can be appreciated that cracks occurred and lifespan was shortened.

On the other hand, in the case of samples 4 to 6 in which the ratio of the thickness T of the cover layer to the thickness t of the ceramic body exceeded 0.05, it can be appreciated that there was no problem of cracks, humidity resistance characteristics, and a high-temperature acceleration lifespan, even when the ratios of Dc/Da, Dc1/Dc2, and Dc1/Dc3 deviated from the numerical ranges of the present invention.

The features of the present invention are to improve humidity resistance characteristics and an extended high-temperature acceleration lifespan while preventing the occurrence of cracks in the laminated ceramic electronic component by controlling the ratios of Dc/Da, Dc1/Dc2, and Dc1/Dc3 when the thickness of the cover layer is relatively thin, and thus, the ratio (T/t) of the thickness T of the cover layer to the thickness t of the ceramic body is 0.05 or less.

The following Table 2 is a table illustrating comparison results of crack occurrence, humidity resistance characteristics, and a high-temperature acceleration lifespan depending on the ratios of Dc/Da, Dc1/Dc2, and Dc1/Dc3 when the ratio T/t of the thickness T of the cover layer to the thickness t of the ceramic body is 0.05 or less.

TABLE 2

| Sample NO. | Thickness T of Cover Layer/Thickness t of Ceramic Body | Dc/Da | Dc1 (nm) | Dc2 (nm) | Dc3 (nm) | Dc1/Dc2 | Dc1/Dc3 | Crack Occurrence | Humidity Resistance Characteristics | High-temperature Acceleration Lifespan |
|---|---|---|---|---|---|---|---|---|---|---|
| *7 | 0.04 | 0.5 | 289 | 86.8 | 52.6 | 3.329 | 5.494 | ◯ | OK | 3.5 h |
| *8 | 0.04 | 0.6 | 288 | 92.2 | 57.1 | 3.124 | 5.044 | ◯ | OK | 4.5 h |
| 9 | 0.04 | 0.7 | 291 | 128 | 63.9 | 2.273 | 4.554 | X | OK | 125 h |
| 10 | 0.04 | 1.0 | 288 | 132 | 71.2 | 2.182 | 4.045 | X | OK | 12.5 h |
| 11 | 0.04 | 1.3 | 336 | 144 | 89.8 | 2.333 | 3.742 | X | OK | 12 h |
| 12 | 0.04 | 1.5 | 375 | 147 | 94.5 | 2.551 | 3.968 | X | OK | 13 h |
| *13 | 0.04 | 1.7 | 487 | 151 | 96.7 | 3.225 | 5.036 | X | NG | 4.0 h |
| *14 | 0.04 | 1.8 | 529 | 162 | 97.1 | 3.265 | 5.448 | X | NG | 3.5 h |
| 15 | 0.048 | 0.7 | 83.2 | 75.2 | 73.1 | 1.106 | 1.138 | X | OK | 10 h |
| 16 | 0.048 | 0.9 | 127.4 | 81.8 | 73.2 | 1.557 | 1.740 | X | OK | 12 h |
| 17 | 0.048 | 1.0 | 169.2 | 83.4 | 73.7 | 2.029 | 2.296 | X | OK | 12 h |
| 18 | 0.048 | 1.1 | 181.3 | 84.8 | 73.9 | 2.138 | 2.453 | X | OK | 13.5 h |
| 19 | 0.048 | 1.3 | 267.4 | 101.4 | 74.4 | 2.637 | 3.594 | X | OK | 12.5 h |
| 20 | 0.048 | 1.4 | 348.1 | 121.6 | 76.3 | 2.863 | 4.562 | X | OK | 11 h |
| 21 | 0.048 | 1.5 | 379.7 | 130.3 | 77.8 | 2.914 | 4.880 | X | OK | 11 h |
| *22 | 0.048 | 1.6 | 422.6 | 139.2 | 77.3 | 3.036 | 5.467 | X | NG | 4.5 h |
| *23 | 0.048 | 1.7 | 467.9 | 144.3 | 76.9 | 3.243 | 6.085 | X | NG | 4.0 h |
| *24 | 0.048 | 1.7 | 534.5 | 151.7 | 77.3 | 3.523 | 6.915 | X | NG | 4.5 h |
| *25 | 0.048 | 1.8 | 613.3 | 178.8 | 77.4 | 3.430 | 7.924 | X | NG | 3.5 h |

*Comparative Example

As can be appreciated from the above Table 2, in the case of samples 9 to 12 according to the embodiment of the present invention, it can be appreciated that cracks did not occur, humidity resistance characteristics were excellent, and a high-temperature acceleration lifespan was good when the ratios of Dc/Da, Dc1/Dc2, and Dc1/Dc3 satisfied $0.7 \leq Dc/Da \leq 1.5$.

On the other hand, in the case of samples 7 and 8 corresponding to the comparative example in which Dc/Da is less than 0.7, it can be appreciated that humidity resistance characteristics are good but cracks occurred and acceleration lifespan was shortened, thereby causing the degradation in the reliability.

In addition, in the case of samples 13 and 14 corresponding to the comparative example in which Dc/Da was less than 1.5, it can be appreciated that the cracks did not occur but humidity resistance characteristics were bad and acceleration lifespan was short, thereby causing the degradation in reliability.

Meanwhile, in the case of samples 15 to 21 according to the embodiment of the present invention satisfying the relationship $1.11 \leq Dc1/Dc2 \leq 2.91$ or the relationship $1.13 \leq Dc1/Dc3 \leq 4.88$, the high-capacity laminated ceramic capacitor with excellent humidity resistance characteristics can be implemented.

In particular, in the case of samples 16 to 19 according to the embodiment of the present invention satisfying the relationship $1.56 \leq Dc1/Dc2 \leq 2.63$ and the relationship $1.74 \leq Dc1/Dc3 \leq 3.59$, it can be appreciated that humidity resistance characteristics were excellent and acceleration lifespan was relatively long, thereby improving reliability.

On the other hand, in the case of samples 22 to 25 in which Dc1/Dc2 exceeded 2.91 and Dc1/Dc3 exceeded 4.88, it can be appreciated that the cracks did not occur but humidity resistance characteristics were bad and acceleration lifespan was short, thereby causing the problem of reliability.

In conclusion, when the ratio of the thickness t of the ceramic body and the thickness T of the cover layer satisfies $T \leq t \times 0.05$, according to the embodiments of the present invention satisfying the relation of $0.7 \leq Dc/Da \leq 1.5$, the relationship $1.11 \leq Dc1/Dc2 \leq 2.91$, or the relationship $1.13 \leq Dc1/Dc3 \leq 4.88$, a high-capacity laminated ceramic capacitor with excellent humidity resistance characteristics while preventing the occurrence of cracks can be implemented.

Further, the high-capacity laminated ceramic capacitor may have the excellent reliability due to excellent humidity resistance characteristics and a long acceleration lifespan.

As set forth above, it is possible to implement the high-capacity laminated ceramic electronic component having excellent humidity resistance by controlling the average grain diameter of the dielectric layer.

While the present invention has been shown and described in connection with the embodiments, it will be apparent to those skilled in the art that modifications and variations can be made without departing from the spirit and scope of the invention as defined by the appended claims.

What is claimed is:

1. A laminated ceramic electronic component, comprising:
   a ceramic body including a dielectric layer; and
   first and second internal electrodes disposed to face each other, having the dielectric layer interposed therebetween within the ceramic body,
   wherein the ceramic body includes an active layer that is a capacitance forming part and a cover layer that is a non-capacitance forming part formed on at least one of a top surface and a bottom surface of the active layer,
   a thickness of the ceramic body is t, a thickness of the cover layer is T, and t and T satisfy a relationship $T \leq t \times 0.05$,
   an average particle diameter of a dielectric grain in the active layer is Da, an average particle diameter of a dielectric grain in the cover layer is Dc, and Da and Dc satisfy a relationship $0.7 \leq Dc/Da \leq 1.5$,
   the cover layer is divided into three equal parts in a thickness direction, and
   an average particle diameter of a dielectric grain in an outermost part among the three equal parts is Dc1, an average particle diameter of a dielectric grain in an intermediate part among the three equal parts is Dc2, and Dc1 and Dc2 satisfy a relationship $1.11 \leq Dc1/Dc2 \leq 2.91$.

2. The laminated ceramic electronic component of claim 1, wherein a ratio of Dc1 to Dc2 satisfies $1.56 \leq Dc1/Dc2 \leq 2.63$.

3. A laminated ceramic electronic component comprising:

a ceramic body including a dielectric layer; and
first and second internal electrodes disposed to face each other, having the dielectric layer interposed therebetween within the ceramic body,
wherein the ceramic body includes an active layer that is a capacitance forming part and a cover layer that is a non-capacitance forming part formed on at least one of a top surface and a bottom surface of the active layer,
a thickness of the ceramic body is t, a thickness of the cover layer is T, and t and T satisfy a relationship T≤t×0.05,
an average particle diameter of a dielectric grain in the active layer is Da, an average particle diameter of a dielectric grain in the cover layer is Dc, and Da and Dc satisfy a relationship 0.7≤Dc/Da≤1.5,
the cover layer is divided into three equal parts in a thickness direction, and
an average particle diameter of a dielectric grain in an outermost part among the three equal parts is Dc1, an average particle diameter of a dielectric grain in an intermediate part among the three equal parts is Dc2, an average particle diameter of a dielectric grain in a bottom part among the three equal parts is Dc3, and a relationship 1.13≤Dc1/Dc3≤4.88 and 1.11≤Dc1/Dc2≤2.91 are satisfied.

4. The laminated ceramic electronic component of claim 3, wherein a ratio of Dc1 to Dc3 satisfies 1.74≤Dc1/Dc3≤3.59.

5. A laminated ceramic electronic component, comprising:
a ceramic body including a dielectric layer; and
first and second internal electrodes disposed to face each other, having the dielectric layer interposed therebetween within the ceramic body,
wherein the ceramic body includes an active layer that is a capacitance forming part and a cover layer that is a non-capacitance-forming part formed on at least one of a top surface and a bottom surface of the active layer,
a thickness of the ceramic body is t, a thickness of the cover layer is T, and a relationship T≤t×0.05 is satisfied,
the cover layer is divided into three equal parts, and
an average particle diameter of a dielectric grain in an outermost part among the three equal parts is Dc1, an average particle diameter of a dielectric grain in an intermediate part among the three equal parts is Dc2, and a relationship 1.11≤Dc1/Dc2≤2.91 is satisfied.

6. The laminated ceramic electronic component of claim 5, wherein a ratio of Dc1 to Dc2 satisfies 1.56≤Dc1/Dc2≤2.63.

7. The laminated ceramic electronic component of claim 5, wherein an average particle diameter of a dielectric grain in a bottom part among the three equal parts is Dc3, and a relationship 1.13≤Dc1/Dc3≤4.88 is satisfied.

8. The laminated ceramic electronic component of claim 7, wherein a ratio of Dc1 to Dc3 satisfies 1.74≤Dc1/Dc3≤3.59.

9. The laminated ceramic electronic component of claim 5, wherein a ratio of Dc1 to Dc2 satisfies 1.56≤Dc1/Dc2≤2.63, an average particle diameter of a dielectric grain in a bottom part among the three equal parts is Dc3, and a relationship 1.13≤Dc1/Dc3≤4.88 is satisfied.

10. The laminated ceramic electronic component of claim 9, wherein an average particle diameter of a dielectric grain in the active layer is Da, the average particle diameter of the dielectric grain in the cover layer is Dc, and a relationship 0.7≤Dc/Da≤1.5 is satisfied.

11. A laminated ceramic electronic component, comprising:
a ceramic body including a dielectric layer; and
first and second internal electrodes disposed to face each other, having the dielectric layer interposed therebetween within the ceramic body,
wherein the ceramic body includes an active layer that is a capacitance forming part and a cover layer that is a non-capacitance-forming part formed on at least one of a top surface and a bottom surface of the active layer,
the cover layer is divided into three equal parts in a thickness direction, and
an average particle diameter of a dielectric grain in an outermost part among the three equal parts is Dc1, an average particle diameter of a dielectric grain in an intermediate part among the three equal parts is Dc2, an average particle diameter of a dielectric grain in a bottom part among the three equal parts is Dc3, and a relationship 1.13≤Dc1/Dc3≤4.88 and 1.11≤Dc1/Dc2≤2.91 are satisfied.

12. The laminated ceramic electronic component of claim 11, wherein a ratio of Dc1 to Dc3 satisfies 1.74≤Dc1/Dc3≤3.59.

13. The laminated ceramic electronic component of claim 11, wherein a ratio of Dc1 to Dc2 satisfies 1.56≤Dc1/Dc2≤2.63.

14. A method of fabricating a laminated ceramic electronic component, comprising:
preparing ceramic green sheets using a slurry including ceramic powder and an additive;
forming internal electrode patterns on each of the ceramic green sheets using a conductive metal paste; and
laminating the ceramic green sheets and performing sintering thereon to form a ceramic body including a dielectric layer and first and second internal electrodes disposed to face each other, having the dielectric layer interposed therebetween,
wherein the ceramic body includes an active layer that is a capacitance forming part and a cover layer that is a non-capacitance forming part formed on at least one of a top surface and a bottom surface of the active layer,
a thickness of the ceramic body is t, a thickness of the cover layer is T, and a relationship T≤t×0.05 is satisfied,
an average particle diameter of a dielectric grain in the active layer is Da, an average particle diameter of a dielectric grain in the cover layer is Dc, and a relationsip 0.7≤Dc/Da≤1.5 is satisfied,
the cover layer is divided into three equal parts in a thickness direction, and
an average particle diameter of a dielectric grain in an outermost part among the three equal parts is Dc1, an average particle diameter of a dielectric grain in an intermediate part among the three equal parts is Dc2, and a relationship 1.11≤Dc1/Dc2≤2.91 is satisfied.

15. The method of claim 14, wherein the average particle diameter of the dielectric grain in the cover layer is controlled by controlling a composition of the additive.

16. A method of fabricating a laminated ceramic electronic component, comprising:
preparing ceramic green sheets using a slurry including ceramic powder and an additive;
forming internal electrode patterns on each of the ceramic green sheets using a conductive metal paste; and
laminating the ceramic green sheets and performing sintering thereon to form a ceramic body including a dielectric layer and first and second internal electrodes disposed to face each other, having the dielectric layer interposed therebetween,
wherein the ceramic body includes an active layer that is a capacitance forming part and a cover layer that is a non-capacitance forming part formed on at least one of a top surface and a bottom surface of the active layer, a thickness of the ceramic body is t, a thickness of the cover layer is T, and a relationship T≤t×0.05 is satisfied, an average particle diameter of a dielectric grain in the active layer is Da, an average particle diameter of a dielectric grain in the cover layer is Dc, and a relationsip 0.7≤Dc/Da≤1.5 is satisfied, the cover layer is divided into three equal parts in a thickness direction, and an average particle diameter of a dielectric grain in an outermost part among the three equal parts is Dc1, an average particle diameter of a dielectric grain in an intermediate part among the three equal parts is Dc2, an average particle diameter of a dielectric grain in a bottom part among the three equal parts is Dc3, and a relationship 1.13≤Dc1/Dc3≤4.88 and 1.11≤Dc1/Dc2≤2.91 are satisfied.

* * * * *